United States Patent
Cecil

(10) Patent No.: US 11,663,485 B2
(45) Date of Patent: May 30, 2023

(54) CLASSIFICATION OF PATTERNS IN AN ELECTRONIC CIRCUIT LAYOUT USING MACHINE LEARNING BASED ENCODING

(71) Applicant: Synopsys, Inc., Mountain View, CA (US)

(72) Inventor: Thomas Christopher Cecil, Menlo Park, CA (US)

(73) Assignee: Synopsys, Inc., Mountain View, CA (US)

( * ) Notice: Subject to any disclaimer, the term of this patent is extended or adjusted under 35 U.S.C. 154(b) by 287 days.

(21) Appl. No.: 16/876,382

(22) Filed: May 18, 2020

(65) Prior Publication Data
US 2020/0372365 A1 Nov. 26, 2020

Related U.S. Application Data

(60) Provisional application No. 62/850,026, filed on May 20, 2019.

(51) Int. Cl.
*G06N 3/08* (2023.01)
*G06N 3/084* (2023.01)

(52) U.S. Cl.
CPC .................. *G06N 3/084* (2013.01)

(58) Field of Classification Search
CPC ..................................................... G06N 3/084
USPC ......................................................... 706/25
See application file for complete search history.

(56) References Cited

U.S. PATENT DOCUMENTS

| | | |
|---|---|---|
| 8,381,152 B2 | 2/2013 | Lai et al. |
| 8,452,075 B2 | 5/2013 | Xu et al. |
| 8,490,034 B1 | 7/2013 | Torunoglu et al. |
| 8,589,848 B2 | 11/2013 | Alpert et al. |
| 9,047,434 B2 | 6/2015 | Borah et al. |
| 11,132,619 B1 * | 9/2021 | Casas ............... G06N 3/082 |
| 2009/0313596 A1 * | 12/2009 | Lippmann .......... G06F 30/327 |
| | | 716/126 |
| 2010/0095254 A1 | 4/2010 | DeMaris et al. |
| 2018/0144071 A1 * | 5/2018 | Yu .................... G06N 20/00 |
| 2018/0189424 A1 | 7/2018 | Boesch et al. |
| 2018/0307792 A1 * | 10/2018 | Kim ............... G03F 7/70433 |

(Continued)

FOREIGN PATENT DOCUMENTS

| | | |
|---|---|---|
| JP | 2008-064820 A | 3/2008 |
| TW | 201816670 A | 5/2018 |

OTHER PUBLICATIONS

PCT International Search Report and Written Opinion, PCT Application No. PCT/US2020/033473, dated Aug. 19, 2020, 13 pages.

(Continued)

*Primary Examiner* — Ryan D. Coyer
(74) *Attorney, Agent, or Firm* — Fenwick & West LLP

(57) ABSTRACT

A system performs distributed or parallel pattern extraction and clustering for pattern classification of large layouts of electronic circuits. The system identifies circuit patterns with a layout representation. The system encodes the circuit patterns using a neural network based autoencoder to generate encoded circuit patterns that can be stored efficiently. The system clusters the encoded circuit patterns into an arbitrary number of clusters based upon a high degree of similarity. The clusters of circuit patterns may be used for training and evaluation of machine learning based models.

20 Claims, 9 Drawing Sheets

(56) References Cited

U.S. PATENT DOCUMENTS

2019/0147127 A1* 5/2019 Su ................. G03F 7/70525
 703/7
2020/0380088 A1* 12/2020 Sha ................. G06F 30/398

OTHER PUBLICATIONS

Taiwan Intellectual Property Office, Office Action, Taiwanese Patent Application No. 109116786, dated Aug. 23, 2021, 12 pages.

* cited by examiner

| Layer (type) | Output Shape | Param # |
|---|---|---|
| conv_fwd_init (Conv2D) | (None, 256, 256, 1) | 10 |
| conv_fwd_0 (Conv2D) | (None, 128, 128, 1) | 10 |
| conv_fwd_1 (Conv2D) | (None, 64, 64, 1) | 10 |
| conv_fwd_2 (Conv2D) | (None, 32, 32, 1) | 10 |
| flatten_1 (Flatten) | (None, 1024) | 0 |
| dense_1 (Dense) | (None, 64) | 65600 |
| autoencoder (Reshape) | (None, 8, 8, 1) | 0 |
| flatten_2 (Flatten) | (None, 64) | 0 |
| dense_2 (Dense) | (None, 1024) | 66560 |
| reshape_1 (Reshape) | (None, 32, 32, 1) | 0 |
| conv_trans_0 (Conv2DTranspos) | (None, 64, 64, 1) | 10 |
| conv_trans_1 (Conv2DTranspos) | (None, 128, 128, 1) | 10 |
| conv_trans_2 (Conv2DTranspos) | (None, 256, 256, 1) | 10 |
| conv_trans_final (Conv2DTranspos) | (None, 256, 256, 1) | 10 |

Total params: 132,240
Trainable params: 132,240
Non-trainable params: 0

- Convolution 3x3 downsampling (conv_fwd_init through conv_fwd_2)
- Dense connection from coarsest forward convolution layer to coarsest encoded 8x8 layer (flatten_1, dense_1)
- Dense connection back to coarsest deconvolution layer (flatten_2, dense_2)
- deconvolution 3x3 upsampling (reshape_1 through conv_trans_final)

FIG. 5

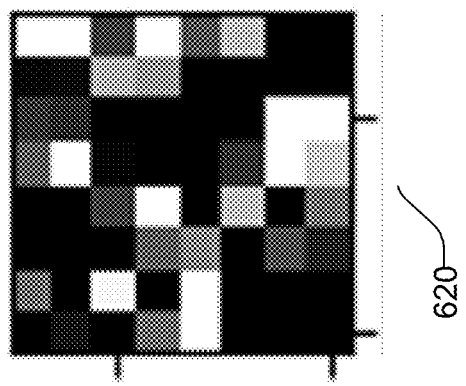
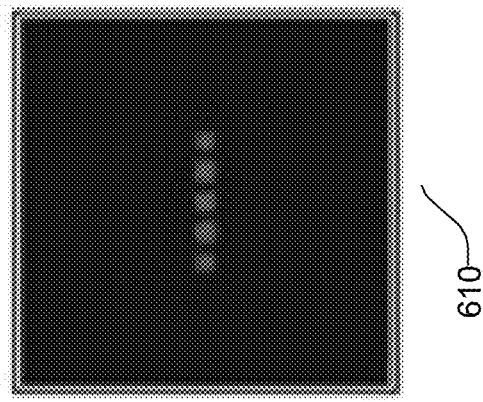
FIG. 6

CLASSIFICATION OF PATTERNS IN AN ELECTRONIC CIRCUIT LAYOUT USING MACHINE LEARNING BASED ENCODING

CROSS REFERENCE TO RELATED APPLICATIONS

This application claims a benefit of U.S. Patent Application Ser. No. 62/850,026, filed May 20, 2019, the contents of which are incorporated by reference herein.

TECHNICAL FIELD

This disclosure relates to the field of electronic design automation in general, and more specifically to distributed pattern extraction and clustering for pattern classification of large layouts of electronic circuits using machine learning based encoding of the patterns.

BACKGROUND

Electronic design automation of large electronic circuits often processes large designs containing billions of unique patterns. Some applications such as lithography model fitting and machine learning (ML) model training require an understanding of the type of patterns within a design so that the models extrapolate well to those patterns. Certain processes performed during electronic design automation of circuits group patterns of electronic circuits into subgroups or clusters where each subgroup or cluster contains similar patterns so that that one representative pattern from each cluster can be used to represent the cluster. Due to the large size of current electronic circuits, performing the pattern collection and subsequent clustering with a billion (or more) patterns is impractical on a single computing system since a single computing system typically does not have sufficient memory and computational power to load and process such large electronic circuits. As a result, conventional techniques that cannot be distributed across a large number of computer processors can only process small electronic circuits.

SUMMARY

Disclosed is a configuration (e.g., system, method, non-transitory computer readable stored medium that includes stored instructions executable by a processor) for classification of layouts of electronic circuits. A representation of a layout of a circuit is received. The layout representation includes geometric shapes. A set of circuit patterns is extracted from the layout representation of the circuit design. The set of circuit patterns is encoded to generate a set of encoded circuit patterns. The encoding of a circuit patterns is performed by providing the circuit pattern as input to a machine learning based encoder configured to receive an input circuit pattern and generate an encoded circuit pattern. The encoded circuit pattern is represented using less data compared to the input circuit pattern. The encoder is executed to generate an encoded circuit pattern corresponding to the input circuit pattern. The set of encoded circuit patterns are clustered into clusters.

In an embodiment, the machine learning based encoder is a neural network based autoencoder that performs (1) encoding and (2) decoding. The encoding/decoding may be performed using sets of functions/steps.

The clusters may be used for training or evaluations of machine learning based models. For example, a machine learning model may be trained by selecting a subset of circuit patterns from each cluster for training the machine learning based model. Similarly, the machine learning model may be evaluated by selecting a subset of circuit patterns from each cluster for evaluating the machine learning based model.

According to an embodiment, the machine learning based encoder is trained using distributed training. Accordingly, training datasets are determined. Each training dataset includes circuit patterns. Computer processors are used for training the machine learning based encoder in parallel. Each computer processor determines a set of parameters for the machine learning based encoder using one of the training datasets. The parameters represent weights of the machine learning based encoder. For example, the machine learning based model may be a neural network comprising nodes, where each node represents a linear combination of inputs of the node, wherein the inputs are weighted according to the parameters. The weights of the machine learning based encoder are adjustable parameters of the model that are adjusted during the training of the machine learning based encoder, for example, via a process of back propagation. The parameters of the trained machine learning based models are applied to new inputs to make predictions using the model. The sets of parameters generated in parallel are aggregated to obtain a combined set of parameters for the machine learning based encoder. This process may be repeated multiple times.

In an embodiment, the machine learning based encoder is a neural network that includes a convolution component comprising a set of layers that receive the input circuit pattern to generate the encoded circuit pattern and a deconvolution component comprising a set of layers that receive the encoded circuit pattern as input and generate an output representation of the circuit pattern. Each of the convolution component and deconvolution component includes a set of layers of the neural network, each layer receiving a set of values, processing the set of values and providing the result to the next layer. Alternatively, each of the convolution component and deconvolution component can be considered as executing a sequence of steps, each step receiving an input, processing the input and providing the result to the next step.

According to an embodiment, the clustering of the encoded circuit patterns is performed using a hierarchical clustering technique. The hierarchical clustering technique is executed using a distributed system that repeatedly divides each cluster into sub-clusters in parallel.

According to an embodiment, the hierarchical clustering determines for each cluster, whether the cluster should be further subdivided into sub-clusters. For each cluster, a measure of similarity of circuit patterns within the cluster is determined. The system determines whether the measure of similarity of circuit patterns represents less than a threshold degree of similarity between the circuit patterns of the cluster. If the measure of similarity of circuit patterns of a cluster represents less than a threshold degree of similarity between the circuit patterns of the cluster, the cluster is further subdivided into sub-clusters. Other embodiments can use other criteria to determine whether to continue subdividing a cluster into sub-clusters as further described herein.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 5 depicts an autoencoder model, according to an embodiment.

FIG. 6 depicts an original rasterized circuit pattern and its encoded representation, according to an embodiment.

DETAILED DESCRIPTION

Large circuit often have several repeating circuit patterns. For example, circuit layouts may have repeating patterns of geometric shapes. Similar circuit patterns store similar information. Accordingly, if a large number of similar circuit patterns are provided as training dataset for training a machine learning model, the model may not be able to process other types of circuit patterns that were not provided as training data.

A layout classification system according to an embodiment classifies circuit patterns of a circuit to generate clusters of similar circuit patterns. The clusters of circuit patterns may be used, for example, for generating training datasets for training machine learning models that include different types of circuit patterns rather than a large number of similar circuit patterns. As a result, a machine learning model trained using the generated training data set is able to handle a much wider variety of circuit patterns compared to a model trained using training dataset that includes a large number of similar circuit patterns.

Layouts of large electronic circuits can include billions of circuit patterns. Loading and processing such large amount of data can consume large amount of computation as well as input/output resources. Conventional techniques for clustering layouts of such large circuits are slow and inefficient or require expensive computational resources.

Embodiments perform clustering by performing steps including: (1) Receiving a circuit design and using distributed processing (DP) to find all the unique patterns in the circuit. (2) Training a machine learning based encoder model using distributed training. This encoder compresses circuit patterns to a smaller size such that the encoded representation of a circuit pattern uses significantly less data than an unencoded representation of the circuit pattern. (3) Clustering the compressed data patterns into clusters, for example, using a distributed hierarchical clustering methodology.

Encoding of the circuit patterns to use less data allows the computational resources to load and process a much larger number of circuit patterns. This reduces the computation time as well as input/output overhead for processing the circuit. Furthermore, the layout classification system performs distributed processing of various steps, for example, for training the machine learning based encoder and for clustering of the encoded circuit patterns. Distributed processing allows execution of the various steps of the clustering process in parallel using a large number of computational process, thereby speeding up the process and allowing much larger circuits to be processed in reasonable time.

Electronic Design Automation Process

Figure 1:
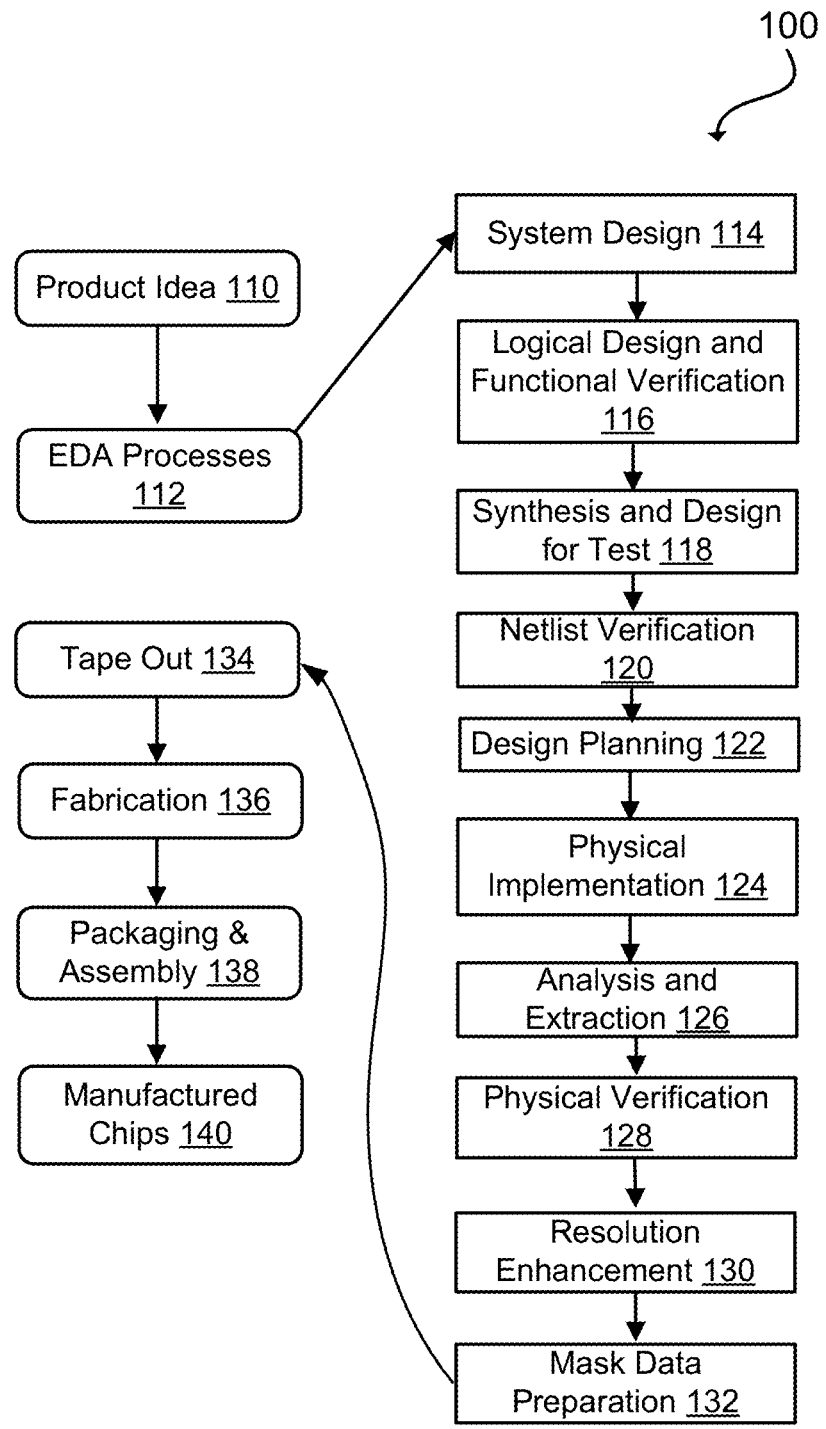
FIG. 1 depicts a flowchart of various processes used during the design and manufacture of an integrated circuit in accordance with some embodiments of the present disclosure.

FIG. 1 illustrates an example set of processes 100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 110 with information supplied by a designer, information which is transformed to create an article of manufacture that uses a set of EDA processes 112. When the design is finalized, the design is taped-out 134, which is when artwork (e.g., geometric patterns) for the integrated circuit is sent to a fabrication facility to manufacture the mask set, which is then used to manufacture the integrated circuit. After tape-out, a semiconductor die is fabricated 136 and packaging and assembly processes 138 are performed to produce the finished integrated circuit 140.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 1. The processes described by be enabled by EDA products (or tools).

During system design 114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 120, the netlist is checked for compliance with timing constraints and for correspondence with the HDL code. During design planning 122, an overall floor plan for the integrated circuit is constructed and analyzed for timing and top-level routing.

During layout or physical implementation 124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 126, the circuit function is verified at the layout level, which permits refinement of the layout design. During physical verification 128, the layout design is checked to ensure that manufacturing constraints are correct, such as DRC constraints, electrical constraints, lithographic constraints, and that circuitry function matches the HDL design specification. During resolution enhancement 130, the geometry of the layout is transformed to improve how the circuit design is manufactured.

During tape-out, data is created to be used (after lithographic enhancements are applied if appropriate) for production of lithography masks. During mask data preparation 132, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Embodiments can be used for processing the circuit designs during various stages of the electronic design automation process that store the circuit layout, for example, layout or physical implementation 124, analysis and extraction 126, mask data preparation 132, and so on.

Architecture of Layout Classification System

Figure 2:
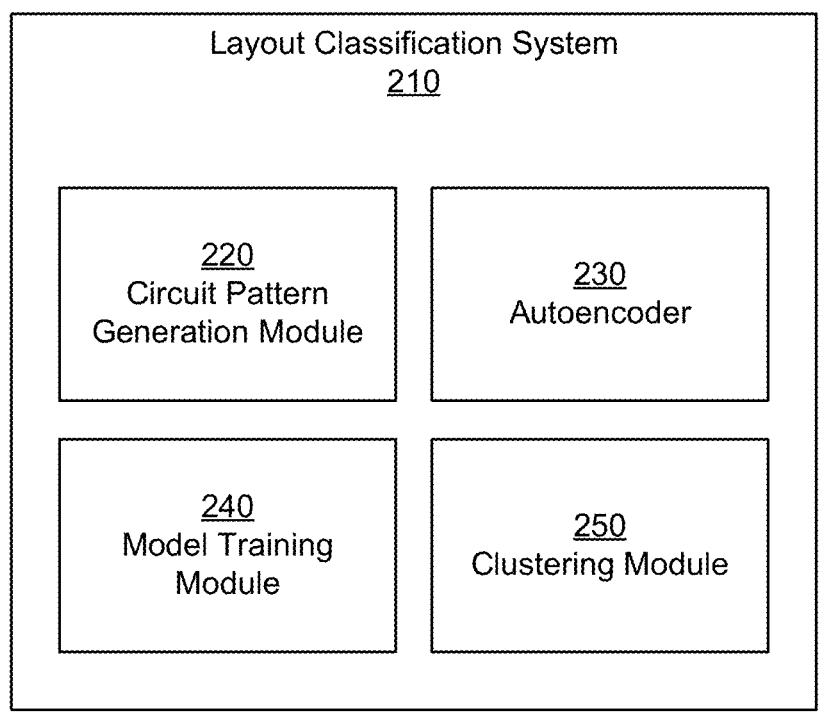
FIG. 2 shows a block diagram of a system architecture of a layout classification system according to an embodiment.

FIG. 2 shows a block diagram of a system architecture of a layout classification system according to an embodiment. The layout classification system 210 includes a circuit pattern generation component 220, an autoencoder 230, a model training component 240, and a clustering component 250. Other embodiments may include more or fewer components than those indicated herein. Functionality indicated herein as being performed by a particular component may be performed by other components than those indicated herein.

The circuit pattern generation component 220 extracts a set of circuit patterns from a representation of layout of a circuit. A circuit pattern is also referred to herein as a clip. In an embodiment, the circuit pattern generation component 220 divides the layout into smaller fragments and computes a unique identifier such as a geometric hash key for each fragment. The computing of the unique identifier is done so that the system can have a compact identifier for each clip which can be compared against other compact identifiers of other clips to see if the clips are identical. The hash key is a mathematical function of the geometry's vertex locations. For example, the mathematical function may aggregate the vertex locations and determine a modulo (or remainder) value using a predetermined value as a divisor. Other geometric hash functions may be used by various embodiments. The circuit pattern generation component 220 stores the hash key for each clip to a database along with the clip's location so that the hash keys can be accessed later. The database allows for the identification of which circuit patterns are present in different locations of the circuit and thus identify the unique set of circuit patterns which in total represent all the varied geometry in the circuit.

The autoencoder 240 is a machine learning based model that receives a representation of a circuit partition as input and outputs a representation of a circuit partition. The autoencoder 240 generates an intermediate representation of the circuit partition that is an encoded representation of the input representation and can be stored using fewer bits than the input representation.

The model training component 230 trains the autoencoder using circuit partitions obtained from the circuit. The model training component 230 trains the autoencoder 240 to output a representation of the circuit partition that matches the input representation of the circuit partition.

The clustering component 250 performs clustering of the circuit partitions of the input layout representation of the circuit. The clustering component 250 stores the clusters. In an embodiment, the generated clusters are used for training or evaluation of machine learning models. For example, a machine learning model may be trained by selecting a subset of circuit patterns from each cluster for use as a training dataset. Use of circuit patterns from each cluster ensures that the training is performed using circuit patterns that are dissimilar from each other. This improves the computational efficiency of the training process since the computational resources are not wasted on training the model with training data that is repetitious. Training the model using repetitious training data wastes resources.

Similarly, the machine learning model may be evaluated by selecting a subset of circuit patterns from each cluster for evaluating the machine learning based model. Evaluating the machine learning based model using circuit patterns from different clusters improves the quality of evaluation of the machine learning based model and ensures that there is adequate coverage of the evaluation across all different types of circuit patterns. Furthermore, the evaluation process using circuit patterns from different clusters improves the computational efficiency of conventional model evaluation techniques since the computational resources are not wasted in evaluating the machine learning based model using similar circuit patterns.

Layout Classification Process

Figure 3:
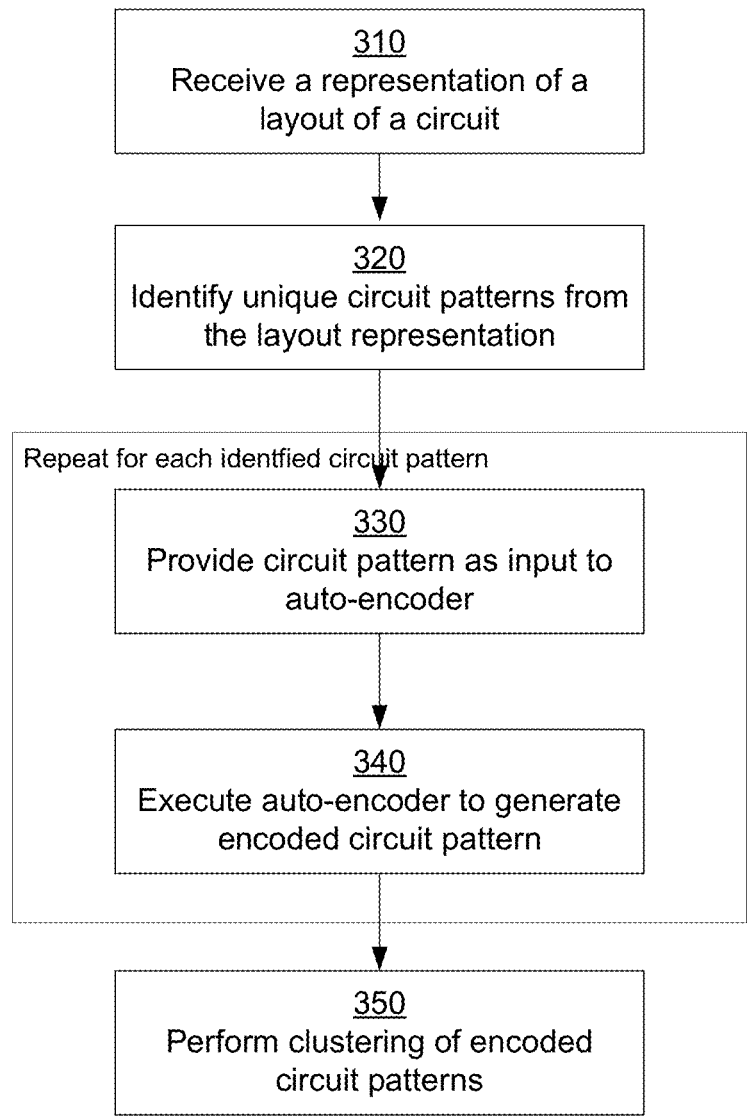
FIG. 3 shows a flowchart illustrating the overall process of layout classification according to an embodiment.

FIG. 3 shows a flowchart illustrating the overall process of layout classification according to an embodiment. The steps shown in the flowchart of FIG. 3 may be performed in an order different from that indicated in the flowchart. For example, certain steps may be performed in parallel with other steps. Furthermore, various steps shown in the flowchart may be performed using a parallel or distributed system.

The layout classification system 210 receives 310 a representation of a layout of a circuit that includes geometric shapes. The circuit pattern generation component 220 identifies 320 unique circuit patterns from the layout representation of the circuit. The circuit pattern generation component 220 stores the unique patterns in a database.

The layout classification system 210 encodes the circuit patterns to generate a set of encoded circuit patterns by repeating the steps 330 and 340 for each circuit pattern that has been identified. The layout classification system 210 provides the circuit pattern as input to an encoder, for example, the autoencoder 230. The encoder is executed to generate an encoded circuit pattern for each circuit pattern. The encoded circuit pattern is represented using less data compared to the input circuit pattern.

Figure 4:
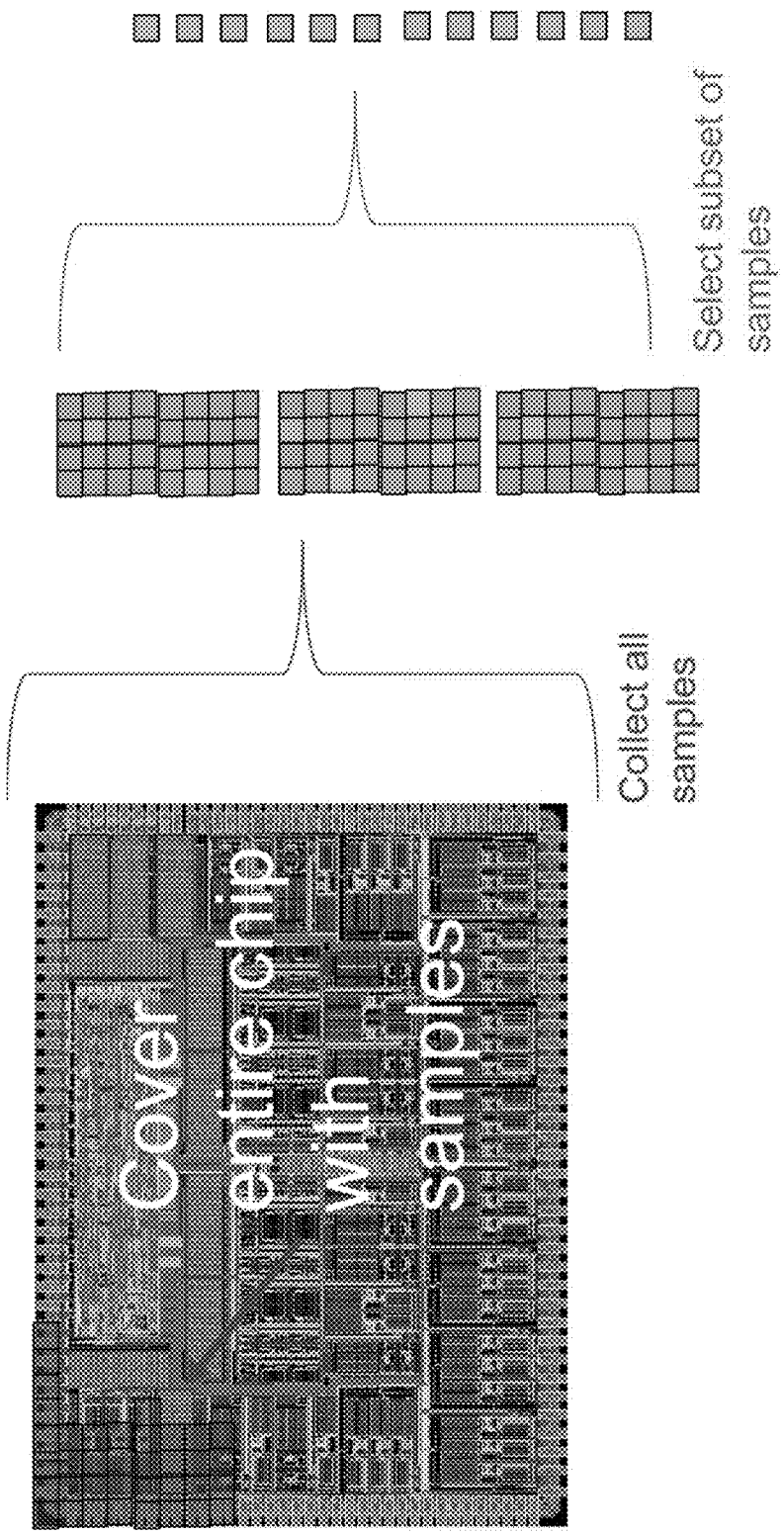
FIG. 4 illustrates the overall flow of process using an example layout according to an embodiment.
Figure 7:
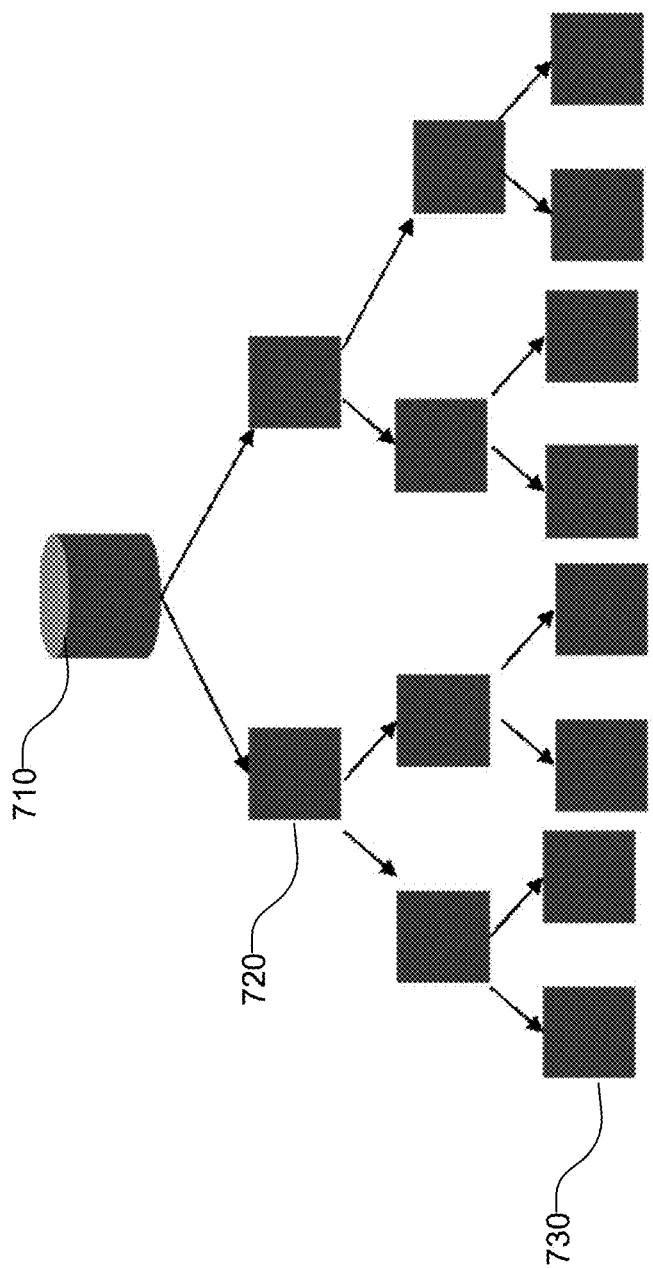
FIG. 7 depicts an example of a top down hierarchical clustering of a layout of a circuit, according to an embodiment.

The clustering component 250 performs clustering of the set of encoded circuit patterns to generate a plurality of clusters of circuit patterns. The generated clusters are stored in a database. The various steps of the process of FIG. 3 are described in further detail herein. The step 320 of identifying unique circuit patterns is illustrated in FIG. 4. The steps 330, 340 of encoding circuit patterns are illustrated in FIG. 5. FIG. 6 shows an example of encoded and unencoded circuit pattern. The step 350 of clustering of encoded circuit patterns is illustrated in FIG. 7.

FIG. 4 illustrates the overall flow of process using an example layout according to an embodiment.

Step1: Identifying All Unique Patterns in the Layout.

In an embodiment, a distributed system partitions the design into circuit patterns, each of which is then processed in parallel to find all the unique windows. For each circuit pattern the layout classification system 210 obtains its hash key. In an embodiment, the layout classification system 210 computes an integer hash key from a geometry layout clip. The hash key may be generated using a geometric hashing technique that generates a key based on features (e.g., geometric patterns) of an input image corresponding to the geometry layout clip. The hash key is used to build a global database of all circuit patterns encountered in the circuit. In some embodiments, the layout classification system 210 treats circuit patterns as identical if the circuit patterns can be obtained from each other via mirroring, translation, or rotation. Accordingly, two circuit patterns that can be obtained from each other by performing one or more of mirroring, translation, or rotation are mapped to the same hash key. The layout classification system 210 stores the geometry clip in a global database, D, that maps the hash keys to circuit patterns, for example, as D[hash key]=geometry_polygons. In an embodiment, the layout classification system 210 uses cloud storage to allow for the large number of key-value pairs to be generated.

Step 2: Building an Autoencoder Model to Reduce the Data Size.

In an embodiment, the model training component 240 uses a distributed machine learning training process to train an autoencoder model 230 which has a smaller data size at its midpoint which represents the encoded data. In an embodiment, the layout classification system 210 converts the polygon data of the circuit layout to a rasterized pixel grid and uses convolutional neural networks in subsequent steps for processing the rasterized pixel grid.

FIG. 5 shows an autoencoder model which receives an input circuit pattern and regenerates the circuit pattern as output. The autoencoder transforms the input circuit pattern into a low dimensional encoded representation generated by a hidden layer of the model before transforming it to the output circuit pattern that matches the input circuit pattern. As a result, the encoded representation generated by the hidden layer of the autoencoder includes all the information of the circuit pattern necessary to regenerate the circuit pattern as output. A hidden layer is also referred to as an internal layer of the autoencoder model.

As shown in FIG. 5, the autoencoder receives a layout representation of a circuit pattern. The autoencoder may include the following components: (1) One or more convolution layers for performing downsampling of the input circuit pattern. The convolution layers scan through the input circuit pattern to identify features of the circuit pattern. The convolution layer may use one or more filters, each filter configured to recognize a specific feature in the circuit pattern. (2) A dense connection to an encoded layer. The encoded layer is a hidden layer (or internal layer). The dense layer connects the outputs of the convolution layers to the inputs of the encoded layer. This layer is dense since it has a large number of connections, for example, each output of the convolution layer may be connected to each input of the encoded layer. (3) The encoded layer represents the input circuit pattern using an encoded representation that uses fewer data values than the input representation. An example of an encoded circuit pattern corresponding to an input circuit pattern is shown in FIG. 6. (4) A dense connection layer connects the outputs of the encoded layer to a one or more deconvolution layers. This layer is also dense since it has a large number of connections, for example, each output of the encoded layer connected to each input of the deconvolution layer. (5) One or more deconvolution layers for upsampling of the encoded circuit pattern to generate a decoded representation of the circuit pattern that matches the input circuit pattern. The deconvolution later reverses the process of convolution performed by the convolution layers and represents an inverse of the convolution operation.

In an embodiment, the model training component 240 performs distributed training of the autoencoder using stochastic weight averaging which may include the following steps. (1) The model training module 240 splits the training data into chunks. (2) The model training module 240 fits the model partially in parallel on each chunk. (3) The model training module 240 averages the weights that came from each partial fitting to create a combined model. (3) The model training module 240 repeats the steps from step 2 and continues training the model from its latest weight values found in step 3.

This allows the model to fit on a larger data set than would be able to be contained in memory on a single computing system.

Once the autoencoder is trained the encoded version of each data point which can result in a 1024×1024 image being reduced to an 8×8 encoded representation is stored. This is done with distributed machine learning based model inferencing. FIG. 6 shows an example of an original rasterized pattern 610 and its encoded representation 620.

In some embodiments, the layout classification system 210 uses geometric densities over different areas of patterns. Accordingly, the layout classification system 210 uses geometric densities to build an encoding of the circuit pattern. In one embodiment, the layout classification system 210 performs sampling of the geometry polarity (polygon/empty space) within a region of a given size and sums up the sampled values to obtain a density value used in the encoded circuit pattern. In another embodiment, the layout classification system 210 rasterizes the polygon and convolves the result with an indicator function which has value one within a certain area and a value zero outside the area to generate pixel values. The layout classification system 210 sums up the pixel values to obtain density values used in the encoded circuit pattern.

In some embodiments, the layout classification system 210 samples different convolutions of the rasterized patterns. Accordingly, the layout classification system 210 uses convolved rasterized patterns. This is done by rasterizing the patterns and then convolving with a set of convolution kernels to obtain a set of convolved images. The layout classification system 210 sums the pixel values to obtain a convolved sum representation which is similar to a density computation as described above.

In some embodiments, the layout classification system 210 performs local sampling of the rasterized patterns or above convolutions. Accordingly, the layout classification system 210 determines a local set of sample points which are geometrically specified (e.g., to be near the center of the circuit pattern). Then the pixelized image (which can be computed from rasterized patterns, convolutions, lithographic images, etc.) is sampled at these points and the layout classification system 210 uses the sampled values directly or computes a mathematical function of the sampled values such as a sum or aggregate value for use in the encoded circuit pattern.

It should be noted that other methods for creating an encoded data set can be used depending on the application, for example taking a lithographic simulation of the polygons and extracting geometric/pixel information from the lithographic simulation. An encoder that is used for encoding the circuit pattern satisfies the following property. If the encoder is applied to two different circuit patterns C1 and C2 that are similar according to certain measure of similarity, the output encoded circuit patterns (e.g., E1 and E2 respectively) are also similar according to the measure of similarity. Accordingly, clusters of input circuit patterns will result in corresponding clusters in the encoded circuit patterns. Encoders that do not satisfy the above property are hash functions that generate keys that are not necessarily similar for similar inputs. Such encoders that do not generate similar encoded circuit patterns for similar circuits are not used in embodiments.

In some embodiments, the layout classification system 210 performs local sampling of lithographic simulations of the patterns. The layout classification system 210 takes the clip polygons and uses them as a mask representation and feeds that into a lithography simulation system to get a simulated wafer image which is then processed as described above by sampling, convolving etc.

Step3: Distributed Clustering

FIG. 7 shows a top down hierarchical clustering of a layout of a circuit, according to an embodiment.

At this step the clustering component 250 clusters the encoded circuit patterns. In one embodiment, the clustering component 250 uses distributed hierarchical clustering because typical clustering algorithms have computational complexity of O(kNd), where, k is the number of clusters, N is the number of patterns to be clustered, and d is the dimension of the patterns.

The clustering component 250 performs clustering as follows. The clustering component 250 initially includes all input circuit patterns as a large cluster. The clustering component 250 divides the cluster into smaller clusters. For each cluster, the clustering component 250 determines a measure of similarity of encoded circuit patterns within the cluster. The clustering component 250 determines whether the measure of similarity of encoded circuit patterns satisfies a threshold condition based on similarity between the encoded circuit patterns of the cluster. If the measure of similarity of encoded circuit patterns indicates less than (or equal to) the threshold degree of similarity between the encoded circuit patterns of the cluster, the clustering component 250 further subdivides the cluster into sub-clusters. If the measure of similarity of encoded circuit patterns indicates more than the threshold degree of similarity between the encoded circuit patterns of the cluster, the clustering component 250 stops subdividing the cluster.

Thus, hierarchical clustering makes the clustering process computationally efficient by reducing k and N (and thus turnaround time per level) as the data including a set 710 of circuit patterns from the circuit is successively split into subclusters 720 which can be subdivided in parallel. So, instead of the complexity for clustering being O(kNd) the system can distribute the work with e.g. 2 subclusters for each branch of the tree and get a complexity of O(Ndlog(k)). This is a significant saving when k is large. Furthermore, conventional techniques need was prohibitively large amount of memory to perform clustering algorithms with large k. In contrast, the disclosed embodiments improve on the memory usage by using encoded circuit patterns that take significantly less storage compared to conventional representations of circuit patterns.

Other methods of clustering which either run on a single machine or distributed machines could also be used by the clustering module 250, for example, k-means, spectral, agglomerative, etc. It will depend on the data volume and other data characteristics as to which clustering method is best suited for the problem at hand.

In an embodiment, the clustering component 250 uses k-means clustering at each hierarchy branch of the clustering tree. The clustering component 250 may use different methods of determining which cluster leaves 730 to split at any given level based on each leaf cluster metrics such as cluster inertia, etc. Various embodiments may use other clustering methods at each hierarchy branch instead of k-means.

Figure 8:
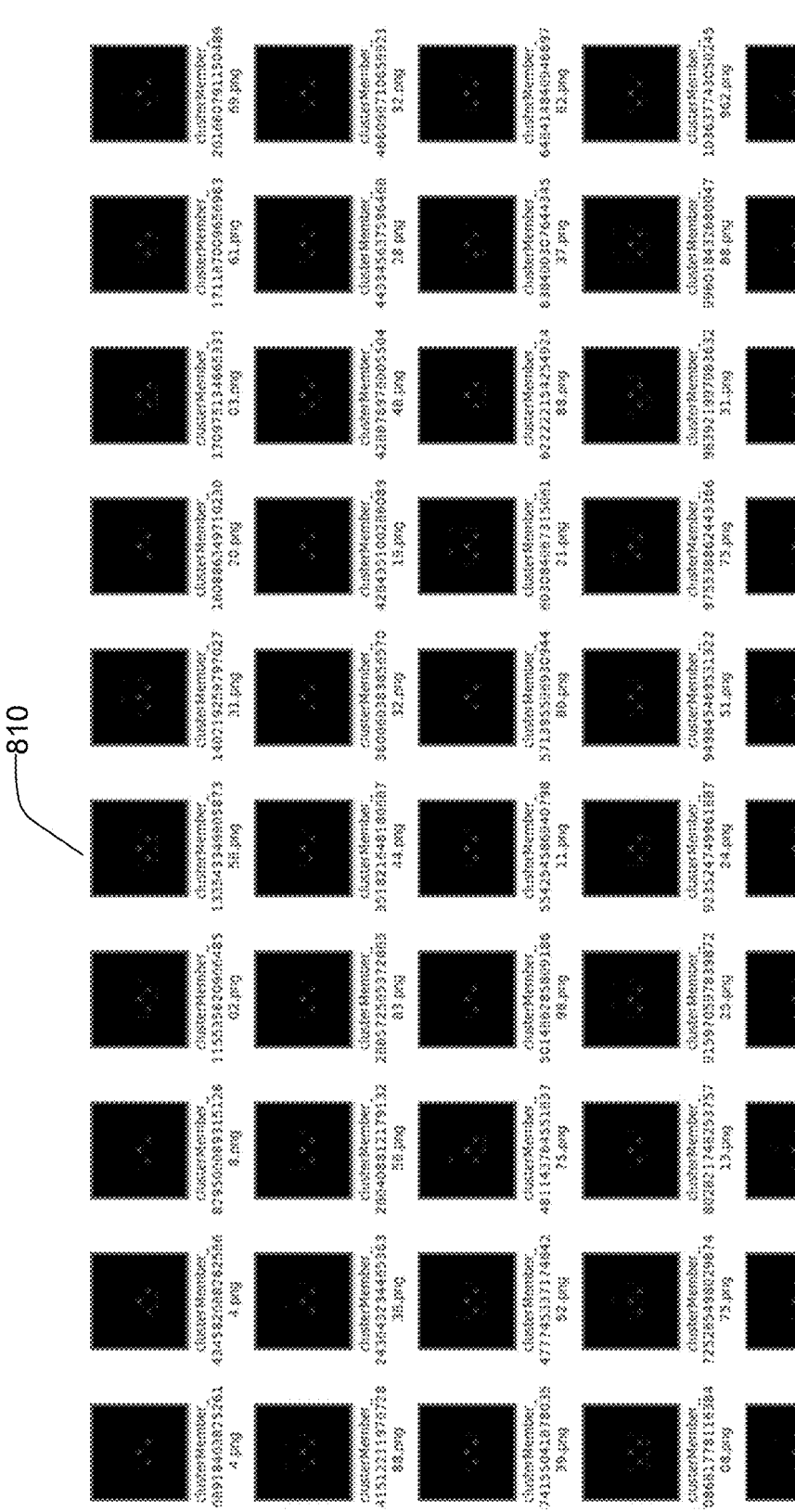
FIG. 8 depicts an example of cluster items after they have been unencoded back to the rasterized polygon space, according to an embodiment.

The encoding of the circuit patterns separates circuit patterns well enough that the resulting clusters have patterns which satisfy a measure of similarity, for example, based on a degree of matching of geometric shapes of the patterns. FIG. 8 shows sample cluster items 810 after they have been unencoded back to the rasterized polygon space. As shown in FIG. 8, various circuit patterns have significant similarities, although there may be small differences in the circuit patterns across the cluster.

Once the clustering tree is completed the leaves of the tree are used as the final clusters. For the hierarchical clustering, the clustering component 250 may use the intermediate cluster branches on the tree to determine if the "best number of clusters" (i.e. not over clustering based on various metrics) is less than the total count of the leaves of the tree. Then a different clustering result is produced without doing further work.

In some embodiments, the clustering component 250 uses application specific metrics to help distinguish when a cluster should be further divided. For example, the clustering component 250 determines whether the measure of similarity of encoded circuit patterns satisfies a threshold condition corresponding to similarity between the encoded circuit patterns of the cluster. If the threshold condition is satisfied, the clustering component 250 further subdivides the cluster. As an example, the threshold condition is satisfied when more than or equal to a threshold percentage of circuit patterns compared are different and the threshold condition is not satisfied if less than the threshold percentage of circuit patterns are different. The comparison of circuit patterns can be performed using any of the following techniques.

The clustering component 250 may use similarity of the polygons nearest to the center of the circuit pattern, for example, by comparing only a subset of the area of the circuit pattern that encompasses the center of the circuit pattern. Accordingly, the clustering component 250 identifies polygons nearest the center of the circuit patterns and compares them across different circuit patterns in a cluster. Limiting the comparison to polygons nearest the center of the polygon makes the process computationally efficient compared to a process that compares the entire circuit pattern.

The clustering component 250 may determine polygon density in a circuit pattern to compare circuit patterns in a cluster. Accordingly, the clustering component 250 determines a measure of polygon density for the circuit patterns of a cluster, for example, by counting the number of polygons in each cluster. The clustering component 250 determines a measure of similarity of circuit patterns in a cluster by comparing their polygon density.

In some embodiments, the clustering component 250 performs sampling of the simulated lithographic image of the polygons in the circuit pattern for comparing circuit patterns of a cluster to determine whether to further subdivide the cluster. Accordingly, the clustering component 250 samples a circuit pattern to select a subset or a region within the circuit pattern and compares with the corresponding subset or region of another circuit pattern.

In some embodiments, the clustering component 250 weighs different portions of an encoded circuit pattern differently. For example, if each encoded circuit pattern has 16 values (numbers), the clustering component 250 puts more emphasis on some of the numbers and less emphasis on others. For example, values closer to the center of the geometric pattern may be weighted differently compared to values closer to the boundary of the circuit pattern. For example, values closer to the center of the geometric pattern may be weighted higher than values closer to the boundary of the circuit pattern. Accordingly, the clustering component 250 weighs some of the values higher than others. The determination of these weights is application specific as each encoded entry has a relative importance which the user will determine. Accordingly, the weights may be received from a user and are configurable.

In some embodiments, the clustering component 250 performs clustering using the encoded circuit patterns but uses the uncompressed (original) circuit pattern corresponding to the encoded circuit patterns to determine whether to further subdivide a cluster. Accordingly, the clustering component 250 performs clustering which is hybrid in nature which performs the actual clustering procedure with the compressed data (encoded circuit patterns), but makes decisions about which clusters to split based on metric on the corresponding original data set (unencoded circuit patterns). For example, a measure of similarity between two circuit patterns may be determined using the unencoded circuit patterns even though the clustering is performed using the encoded circuit patterns.

Computer Architecture

Figure 9:
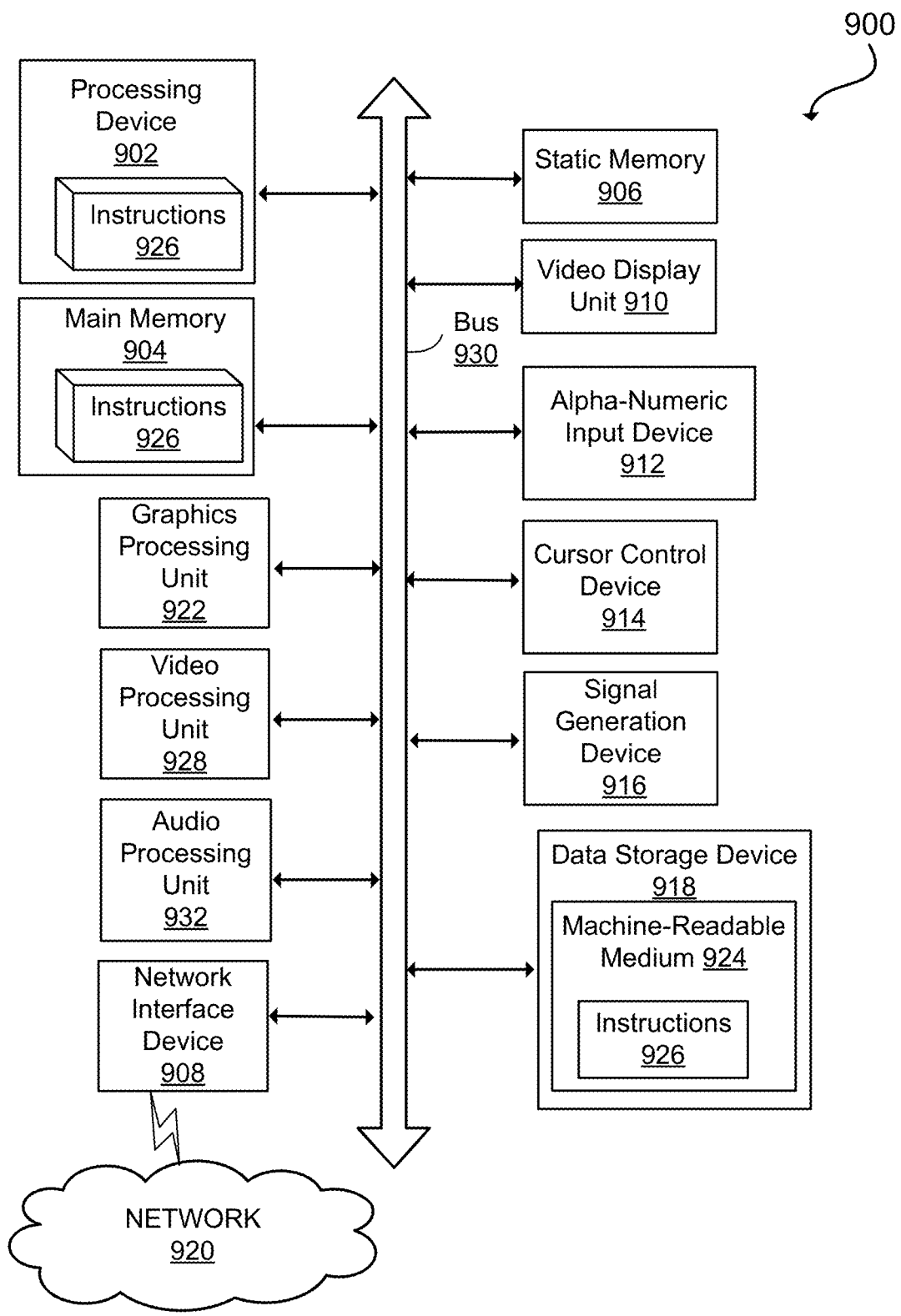
FIG. 9 depicts an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing classification of a physical layout of a circuit, the method comprising:
   receiving a representation of the physical layout of the circuit;
   identifying a set of circuit patterns from the representation of the physical layout of the circuit;
   encoding, by a processor, the set of circuit patterns as a set of encoded circuit patterns comprising one encoded circuit pattern for each circuit pattern in the set of circuit patterns, wherein the encoding is performed using a neural network trained to receive a circuit pattern as input and generate an encoded circuit pattern that matches the circuit pattern received as input, wherein the encoded circuit pattern has smaller data size compared to the circuit pattern received as input; and
   clustering the set of encoded circuit patterns into a plurality of clusters, comprising:
      for each cluster, determining a measure of similarity of encoded circuit patterns;
      determining whether the measure of similarity of encoded circuit patterns satisfies a threshold condition; and
      responsive to the measure of similarity of encoded circuit patterns satisfying the threshold condition, further subdividing the cluster into sub-clusters.

2. The method of claim 1, wherein the neural network is an autoencoder trained to receive an input circuit pattern and generate an output representation of the circuit pattern that matches the input circuit pattern, wherein an internal layer of the neural network generates the encoded circuit pattern.

3. The method of claim 2, wherein the neural network comprises:
   a convolution layer that receives the input circuit pattern to generate the encoded circuit pattern.

4. The method of claim 3, wherein the neural network further comprises:
a deconvolution layer that receives the encoded circuit pattern as input and generates an output representation of the circuit pattern.

5. The method of claim 1, further comprising:
performing distributed training of the neural network using a subset of circuit patterns of the circuit.

6. The method of claim 5, wherein the distributed training comprises:
determining a plurality of training datasets, each training dataset comprising a plurality of circuit patterns;
using a plurality of computer processors for training the neural network in parallel,
wherein each computer processor determines a set of parameters for the neural network using one of the plurality of training datasets; and
aggregating the set of parameters generated in parallel to obtain a combined set of parameters for the neural network.

7. The method of claim 1, further comprising:
using the plurality of clusters of the encoded circuit patterns for training a machine learning based model, the training comprising, selecting a subset of circuit patterns from each cluster for training the neural network.

8. The method of claim 1, further comprising:
using the plurality of clusters of the encoded circuit patterns for evaluation of a trained machine learning based model, the evaluation comprising, selecting a subset of circuit patterns from each cluster for evaluating the neural network.

9. The method of claim 1, wherein clustering the encoded circuit patterns is performed using a hierarchical clustering technique.

10. The method of claim 9, wherein the hierarchical clustering technique is executed using a distributed system that divides each cluster into sub-clusters in parallel.

11. The method of claim 1, wherein the measure of similarity of circuit patterns is determined for a pair of circuit patterns by comparing a corresponding portion of each circuit pattern from the pair of circuit patterns.

12. The method of claim 1, wherein the measure of similarity of encoded circuit patterns assigns different weights to different portions of the encoded circuit patterns.

13. The method of claim 1, wherein the measure of similarity of circuit patterns is determined by comparing polygon density of circuit patterns.

14. The method of claim 1, wherein the measure of similarity of circuit patterns is determined using circuit patterns input to the neural network and dividing the cluster into sub-clusters is performed using encoded circuit patterns.

15. A non-transitory computer readable medium comprising stored instructions, which when executed by a processor, cause the processor to perform steps comprising:
receiving a representation of a physical layout of a circuit;
identifying a set of circuit patterns from the representation of the physical layout of the circuit;
encoding, by a processor, the set of circuit patterns as a set of encoded circuit patterns comprising one encoded circuit pattern for each circuit pattern in the set of circuit patterns, wherein the encoding is based on an execution of a neural network trained to receive a circuit pattern as input and generate an encoded circuit pattern that matches the circuit pattern received as input, wherein the encoded circuit pattern has smaller data size compared to the circuit pattern received as input; and
clustering the set of encoded circuit patterns into a plurality of clusters, comprising:
for each cluster, determining a measure of similarity of encoded circuit patterns;
determining whether the measure of similarity of encoded circuit patterns satisfies a threshold condition; and
responsive to the measure of similarity of encoded circuit patterns satisfying the threshold condition, further subdividing the cluster into sub-clusters.

16. The non-transitory computer readable medium of claim 15, wherein an internal layer of the neural network generates the encoded circuit pattern.

17. The non-transitory computer readable medium of claim 15, the steps further comprising performing distributed training by performing:
determining a plurality of training datasets, each training dataset comprising a plurality of circuit patterns;
using a plurality of computer processors for training the neural network in parallel,
wherein each computer processor determines a set of parameters for the neural network using one of the plurality of training datasets; and
aggregating the set of parameters generated in parallel to obtain a combined set of parameters for the neural network.

18. A system comprising:
a memory storing instructions; and
a processor, coupled with the memory and to execute the instructions, the instructions when executed cause the processor to perform steps comprising:
receiving a representation of a physical layout of a circuit;
identifying a set of circuit patterns from the representation of the physical layout of the circuit;
encoding the set of circuit patterns as a set of encoded circuit patterns comprising one encoded circuit pattern for each circuit pattern in the set of circuit patterns, wherein the encoding is based on an execution of a neural network trained to receive a circuit pattern as input and generate an encoded circuit pattern that matches the circuit pattern received as input, wherein the encoded circuit pattern has smaller data size compared to the circuit pattern received as input; and
clustering the set of encoded circuit patterns into a plurality of clusters comprising:
for each cluster, determining a measure of similarity of encoded circuit patterns;
determining whether the measure of similarity of encoded circuit patterns satisfies a threshold condition; and
responsive to the measure of similarity of encoded circuit patterns satisfying the threshold condition, further subdividing the cluster into sub-clusters.

19. The system of claim 18, wherein an internal layer of the neural network generates the encoded circuit pattern.

20. The system of claim 18, the steps further comprising, performing distributed training by performing:
determining a plurality of training datasets, each training dataset comprising a plurality of circuit patterns;
using a plurality of computer processors for training the neural network in parallel, wherein each computer processor determines a set of parameters for the neural network using one of the plurality of training datasets; and aggregating the set of parameters generated in parallel to obtain a combined set of parameters for the neural network.

* * * * *